Fig. 2

INVENTORS
Michael D. Leis
James L. Sitomer
BY *Joseph J. Alekshun Jr.*
ATTORNEY

Fig. 3

INVENTORS
Michael D. Leis
James L. Sitomer
BY Joseph J. Alekshun, Jr.
ATTORNEY

INVENTORS
Michael D. Leis
James L. Sitomer
BY Joseph J. Alekshun Jr.
ATTORNEY

United States Patent Office 3,508,444
Patented Apr. 28, 1970

3,508,444
TIME SHARING PULSED REBALANCING SYSTEM
James L. Sitomer, Middleton, and Michael D. Leis, Cambridge, Mass., assignors to Massachusetts Institute of Technology, Cambridge, Mass., a corporation of Massachusetts
Filed Mar. 27, 1967, Ser. No. 626,199
Int. Cl. G01p 15/08
U.S. Cl. 73—517                                            7 Claims

ABSTRACT OF THE DISCLOSURE

Apparatus for maintaining the linear or angular deviation of a suspended mass from a null position within predetermined limits. A transducer time shares as a position monitor producing an error signal according to the mass deviation and as a force generator to restore the mass. A sampler periodically samples the amplitude and phase of the error. When the error exceeds a predetermined level, the sampler signals an electronic relay to emit an electrical pulse of fixed duration and of the proper polarity causing the transducer to impart a pulse of restoring force that drives the mass toward null.

BACKGROUND OF THE INVENTION

Field of invention

This invention relates generally to force rebalancing feedback systems and particularly those incorporated in pulse rebalancing electromechanical instruments.

Description of prior art

The principle of force rebalancing or restoring is widely used in the field of instrumentation. For example, it is employed in instruments measuring force or quantities related to force by Newton's laws, such as the specific force influencing an accelerometer, or the mass flow in a fluid system. Such instruments incorporate a suspended seismic mass that is subject to the quantity being measured, an optical, mechanical or electrical position sensor and a separate force transducer intercoupled in a negative feedback loop. The positional sensor detects any deviation of the mass from a reference or null position and continually drives a transducer to exert a measureable counterbalancing force on the mass. The external physical quantity sought is readily measured as it is related to the rebalancing force produced by the transducer most often by a simple scale factor multiplier. In a pulsed restraining instrument, the mass is usually dithered about the null and the measurement obtained made by determining the net impulse imparted on the mass by the transducer.

Sometimes force rebalancing circuits are used in auxiliary feedback loops in an instrument simply to maintain a mass in a fixed position. For instance, in the so-called M.I.T. inertial reference integrating gyros (IRIG) described between pages 103–111 of Inertial Guidance, by C. Draper, W. Wrigley and J. Hovorka, Pergammon Press (1960), the gyro wheel is contained within a float buoyantly supported by a damping fluid. Multiple force rebalancing electromagnetic suspensions function to hold the float centered in five dimensions and away from its mechanical end pivots. The electromagnet providing the suspension, usually called a microsyn, is operated as an A-C excited, series tuned, variable reluctance device. The suspension coils operate in complementary pairs and are individually tuned by an external capacitor so that the excitation frequency is at the second half power point when the float is centered. If the float departs from the center and advanced towards one coil, its inductance increases causing a decrease in current. Conversely, the current in the complementary coil increases. The resulting changes in the two coils are such as to decrease the energy level in the decreased gap and increase the energy of the increased gap. The complementary change in energy in the two gaps generates a resultant force that re-centers the mass.

The following observations may be made regarding force rebalancing loops of the kind described. When used in the force measuring loop of an instrument, operation is continuous and is therefore undesirably always consuming power. Also, in many instruments the positional sensor is of one form and the force transducer of another. This can complicate the design of the instrument as the dynamic characteristics of each must be studied separately and oftentimes special interfaces must be provided to make them compatible in closed loop operation. Similarly, pulse restraining tuned loops used in magnetic mass suspension are technically complex and difficult to work with. In particular, although the inductance of a coil is a function of the width of the related air gap, it is also dependent on the current flowing in the coil. Consequently, when the inductance initially decreases due to an increase in the width of the gap, more current is called for by the loop to restore the mass. However, the increased current introduces a complication by changing the permeability of the magnet and thereby decreasing its inductance even further. The net effect is that the electromagnet operates in a positive feedback mode until the magnet is driven into saturation. Such a phenomenon being a function of two independent nonlinear effects is difficult to analyze and control precisely.

SUMMARY OF INVENTION

In view of the above described limitations of force rebalancing feedback systems, applicant has as the primary object of his invention to simplify the design and reduce the nonlinear complications existing in such systems.

It is another object of the invention to provide a force rebalancing system having high stiffness.

It is another object of the invention to provide a force rebalancing system that provides a precise digital indication of the position of a seismic mass.

It is another object of the invention to provide a force rebalancing system of reduced cost and complexity and that consumes minimal power.

These and other objects are met by a time shared pulse rebalancing feedback system comprising an electromechanical transducer, a combination sampler and a three level electronic relay, and a timing circuit. The transducer, which may be an inductive or capacitive device, time shares as a positional sensor and a force driver according to a continuous sequence of reset and sample pulses received by the sampler from the timing circuit. When acting as a sensor the transducer generates an error signal whose amplitude and phase is defined by the deviation of the mass from a null position, and when serving as a driver exerts a force pulse on the mass to restore it. In operation, the sampler responds to a sample pulse from the timer by sampling and holding the amplitude and phase of the error signal generated by the transducer. If the amplitude of the error signal exceeds a threshold level, the electronic relay applies driving current to the transducer thereby switching it into driving mode of operation. Accordingly, a force pulse is imparted on the mass to drive it toward null. Subsequently the timing circuit emits a reset pulse causing the switch to cease providing driving current and the transducer respondingly reverts to its sensing mode of operation. Upon receipt of a subsequent sample pulse, the sampler once more samples and holds the error signal and the preceding sequence is repeated. The transducer thus applies a series of corrective force pulses to restore the mass to its null position but only when the error signal exceeds a threshold level. The net momentum imparted on the mass is a measure of the external force that originally caused the deviation. Thus, a measure of this force may be obtained simply by algebraically summing the force pulses. By proper design on the threshold level, the system will not naturally limit cycle and therefore consumes driving power only when the mass needs to be restored. Also, as the same electromechanical transducer functions both as a positional sensor and a force driver, only one kind of component is required to serve the combined function. This reduces the cost and complexity of the system.

PREFERRED EMBODIMENT

Theoretical background

A detailed analysis of the considerations underlying the design of the invention preferably embodied in the auxiliary magnetic mass suspension loop of an accelerometer is contained in the Master of Science thesis entitled "A Pulse Restrained Magnetic Suspension," by Michael D. Leis, published as Report No. T–442, by the Instrumentation Laboratory of the Massachusetts Institute of Technology. In order to provide a theoretical foundation for better understanding the concepts involved, certain basic principles regarding the performance of electromagnet transducers discvussed in that thesis are here presented.

The inductance of each coil of the complementary poles in an electromagnet transducer for example, the poles of a microsyn, disposed about a metallic seismic mass is set forth in Equation 1.

$$L = \frac{N^2 \mu_0 a_g}{2(g_0 + \Delta x)} \times 10^{-9} \text{ henries} \quad \text{Equation (1)}$$

where,

N is the number of turns on the pole pair (turns),
$\mu_0$ the permeability of the coil ($4\pi$ gauss/oersted)
$a_g$ the area of the one pole face (cm.²)
$g_0$ the distance between the face of one pole and the center or null position of the mass, and
$\Delta x$ the deviation of the mass from null.

A deviation $\Delta x$ in the mass varies the inductance according to Equation 2.

$$\Delta L = \frac{\Delta x}{g_0} L_0 \left( \frac{1}{1 + \frac{\Delta x}{g_0}} \right) \text{ henries} \quad \text{Equation (2)}$$

where, $$L_0 = \frac{N^2 \mu_0 a_g}{2g_0} \times 10^{-9}$$

or the inductance of the gap $g_0$ when the mass is centered. For small displacements where $$\frac{\Delta x}{g_0} \leq .0333$$

$$\Delta L = \frac{L_0}{g_0} \Delta x \left( \frac{\text{henries}}{\text{cm.}} \right) \quad \text{Equation (3)}$$

with less than 3% error.

Thus it is apparent from Equation 3 that a change in the deviation of the mass from an established null may be measured by determining the corresponding change in inductance occurring in the complementary coils.

Now consider the same poles when they are energized with D-C current ($i$) or a voltage (E) from a relay so that they develop a D-C driving force $f_x$ on the mass. Equations 4 and 5 define the relationship between the driving force and the input current and voltage, respectively $$f_x = (0.915) \frac{N^2 \mu_0 a_g i^2}{4(g_0 + \Delta x)^2} \times 10^{-2} \text{ dynes} \quad \text{Equation (4)}$$

or $$f_x = \frac{(0.915) N^2 \mu_0 a_g E^2}{4(g_0 + \Delta x)^2 (R + r_{D-C})^2} \times 10^{-2} \text{ dynes} \quad \text{Equation (5)}$$

where R is the value of a resistor ordinarily placed in series with the coil and $r_{D-C}$ is the resistance of the coil itself.

Equation 5 or 6 may be re-written in terms of a constant modifying the only variable—the deviation $\Delta x$ of the mass, or, rewriting Equation 5

$$f_x = \frac{K_1}{\left(1 + \frac{\Delta x}{g_0}\right)^2} \text{ dynes} \quad \text{Equation (6)}$$

It may also be observed that Equation 6 is a nonlinear function but that it may be linearized by truncating the power series expansion for the quadratic term. The power series may be truncated after the linear term with less than 6% error if $$\frac{\Delta x}{g_0} < .0333$$

In this event, the force of Equation 4 is equal to a constant $K_1$ and independent of displacement, or $$f_x = K_1 \text{ dynes} \quad \text{Equation (7)}$$

Simplified single axis version of invention

Figure 1:
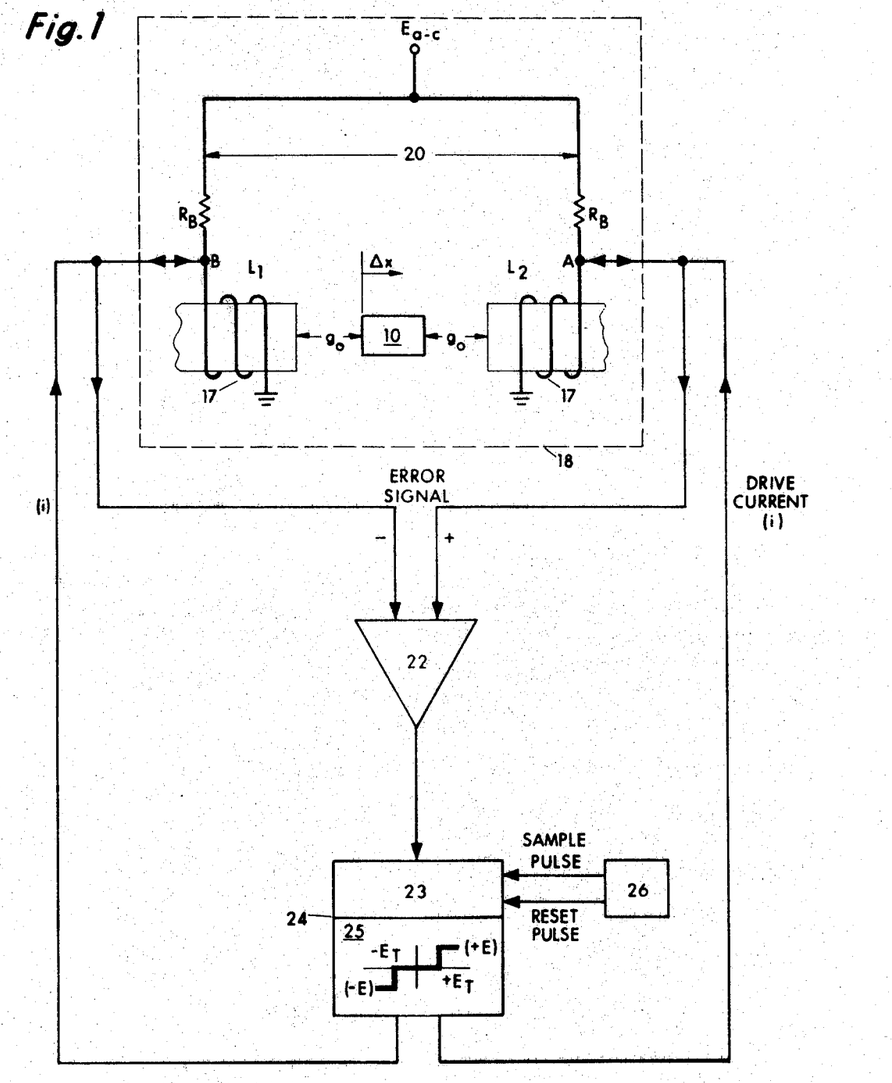
FIG. 1 is a block diagram of a single axis pulsed restoring system in accordance with the invention.

With these positional sensing and force driving characteristics of an electromagnet transducer defined, reference is now made to FIG. 1 which contains a block diagram of a simple single-axis pulsed restoring system in accordance with the invention. The system comprises electromagnet transducer 18 having complementary poles or electromagnets symmetrically disposed about mass 10, difference amplifier 22, timing circuit 26, and electronic apparatus 24 including sampler 23, a three level electronic relay 25 and associated logic circuitry. The electromagnets are excited by an A-C resistance bridge 20. Electronic apparatus 24 receives, through amplifier 22, the amplified error signal generated between output terminals A and B of the bridge, and also receives timing signals comprising sample and reset pulses from timing circuit 26. The output apparatus 24 is fed back and provides D-C driving current ($i$) to output terminals A or B of the bridge.

Functionally, as resistors of bridge 20 have a common value $R_B$, the bridge generates a differential error voltage only when the inductances $L_1$, $L_2$ of coils 17 are different. As previously mentioned, such a difference is brought about by movement of mass 10. The sensitivity $\Delta e / \Delta x$ of the bridge to changes in position of mass 10 along the $x$ axis is arrived at by multiplying the incremental ratio of Equation 3 by $\Delta e/\Delta L$ and is expressed by Equation 8, as $$\frac{\Delta e}{\Delta x} = \frac{E_{ac}}{g_0} \frac{\text{Volts}}{\text{cm.}} \text{ where } \frac{x}{g_0} \leq .0333$$

Equation (8)

and $E_{ac}$ is the amplitude of the excitation voltage applied to the bridge. Because changes in deviation, $\Delta x$, of the mass from null modulate the excitation voltage $E_{ac}$ to produce the differential error voltage $\Delta e$, the error voltage between output terminals A, B of the bridge is a double side band suppressed carrier signal. If the incremental symbols in Equation 8 are disregarded, it is observed that the amplitude of the error signal is directly related to the amplitude of deviation $\Delta x$. Moreover, as is known to those familiar with the operation of A-C inductance bridges of the kind described, the phase of the error signal between terminals A and B is also dependent on the direction of deviation $\Delta x$. That is, the phase of the error signal is shifted by 180 electrical degrees if the deviation is in the negative $x$ direction from the error signal generated when the deviation is in the positive $x$ direction.

The error signal, upon being amplified by differential amplifier 22, is coupled to sampler 23 in electronic apparatus 24. Sampler 23 performs a zero order sample and hold operation well known in the art of digital sampling, and a logic function. Specifically, if the sampled positional error is positive and greater than threshold level ($+E_T$), a zero order hold of state $+E$ is stored; but if the sampled positional error is negative and exceeds threshold ($-E$), a zero order hold state $-E$ is stored. If the error is less than either threshold (relay deadband operation), a zero state is stored. Electronic switch 25 responds to the three foregoing states by applying a force restoring D-C driving current to the appropriate output terminal of the bridge. Thus, if the stored state in the sampler is $+E$, a D-C current is applied to terminal B for a period to be defined, thereby increasing the stored energy in the air gap and causing a negative force (in the negative $x$ direction) to be exerted on mass 10. Conversely, if the stored state is $-E$, a D-C driving current is applied to terminal A for the defined period, and the mass is forced in the plus $x$ direction. Storage of state zero results in the application of no current to either output terminal of the bridge.

Furthermore, operation of electronic apparatus 24 is in accord with a sequence of sample and reset pulses generated by timing circuit 26. The sample pulses are in a continuous train with period $T_S$ that is a submultiple of the bridge excitation frequency, and they maintain a constant phase relationship with that excitation. For maximum sensitivity this phase is set at 90 electrical degrees, in other words, sampling occurs only when the sinusoidal excitation voltage is maximum. Each sample pulse is followed by a reset pulse delayed by a time interval $T_R$. System operation is such that sampler 23 instantaneously samples the amplified error signal and electronic relay 25 applies driving current, if at all, only when apparatus 24 receives a sample pulse. Upon receipt of a subsequent reset pulse, the relay impedes the flow of any driving current to the output terminals of the bridge. Thus, driving current is applied only for the period $T_R$. The remaining interval $T_S - T_R$ (when the mass is not subject to a corrective force) is adequate to permit transients occasioned by the application of driving current to terminate.

One of the prime advantages of the system of FIG. 1 is that by proper operation and the appropriate selection of system parameters, power consumption may be minimized.

Specifically, in the third and sometimes higher order systems, by proper design of the combination of threshold level $E_T$ or deadband zone in electronic relay 25 and loop gain, the 1–1 and higher order limit cycle modes may be avoided so that the system consumes restoring power only when the deviation of mass 10 is sufficient to warrant it. Numerous textbook references in system analysis are available that describe design considerations involved in controlling limit cycle modes. Applicant, however, points out that Weiner, in his Doctor of Science thesis entitled "Theoretical Analysis of Gimballess Inertial Reference Equipment Using Delta-Modulated Instruments," published by the Massachusetts Institute of Technology's Instrumentation Laboratory as T-300 (1962), suggests two approaches toward ascertaining the appropriate deadband zone for a given loop gain. Where the calculations yield two values, the larger of the two zones is used.

The first method considers the dynamics of the system when the mass has zero velocity and has just incrementally crossed the threshold position when a force pulse is applied. The mass will be restored a distance of one bit size by one force pulse of width $T_R$. The bit size for a particular system may be derived as shown by Weiner and the peak to peak deadband ($2E_T$) must be greater than the derived bit size. The computed threshold is necessary to prevent the mass from crossing through the deadband and out the opposing side whereupon a limit cycle may occur.

The second technique described by Weiner proposes the computation of the describing function for the nonlinear relay and thereupon the application of linear feedback techniques to the system. The sought system parameters such as the gain of the respective elements and the threshold level may be obtained by testing the stability of the linearized system at discrete frequencies that will entertain oscillation or limit cycle. These frequencies are the submultiples of the sampling frequency, in other words, the frequency corresponding to the period $T_S$.

The system of FIG. 1 moreover accommodates the application of another power reduction approach. It is noted that only the error signal level coinciding with the receipt of a sample pulse is relevant. Thus, once the corresponding state is stored in electronic apparatus 24 as previously described, differential amplifier 22 serves no further purpose until the succeeding sample pulse occurs. Consequently, it may be turned off for almost the entire interceding interval. Since some signal is required to restore power to amplifier 22, so it will be ready for the next sample, it proves convenient to use the reset pulse to re-activate the amplifier. This notion of turning off circuit elements when they are not needed with the objective of conserving power is similar to that previously suggested by Baker et al. of M.I.T. in "Pulse Powered Circuits," NEREM Record, 1965.

Complex three axis version of invention

The foregoing features of the invention were successfully demonstrated in the suspension of a pendulous mass in a modified Pulsed Integrating Pendulous Accelerometer (PIPA). In the typical PIPA the mass constitutes an unbalanced cylinder that is contained within a housing or case and isolated from the housing by damping fluid and magnetic end suspensions. The end suspensions are provided by a pair of eight pole microsyn generators, one microsyn designated as a signal generator and the other as a torque generator. Because each is designated to perform a separate function, the dynamic characteristics of the two generators are different.

The signal and torque generators simultaneously operate in two feedback loops. In the primary or measuring loop, the signal generator measures the rotation of the mass about its sensitive axis, caused by an input component of specific force. The signal emitted from the signal generator is coupled back to the torque generator in such a way as to minimize rotation. The torquing current necessary to counteract rotation is directly related to the sought measure of specific force.

Whereas the primary loop performs the instrumentation, the secondary loop functions to maintain the position of the mass fixed relative to the housing. The secondary loop is more complex as it works to prevent the mass from translating relative to the housing or rotating about its two remaining axes. To provide a more extensive explanation of the features and operation of the invention, the present time sharing system is described in the context of the more complex secondary loop. However, it is to be understood that the invention is likewise adaptable to the primary loop to counterbalance rotation of the mass about its sensitive axis.

Figure 2:
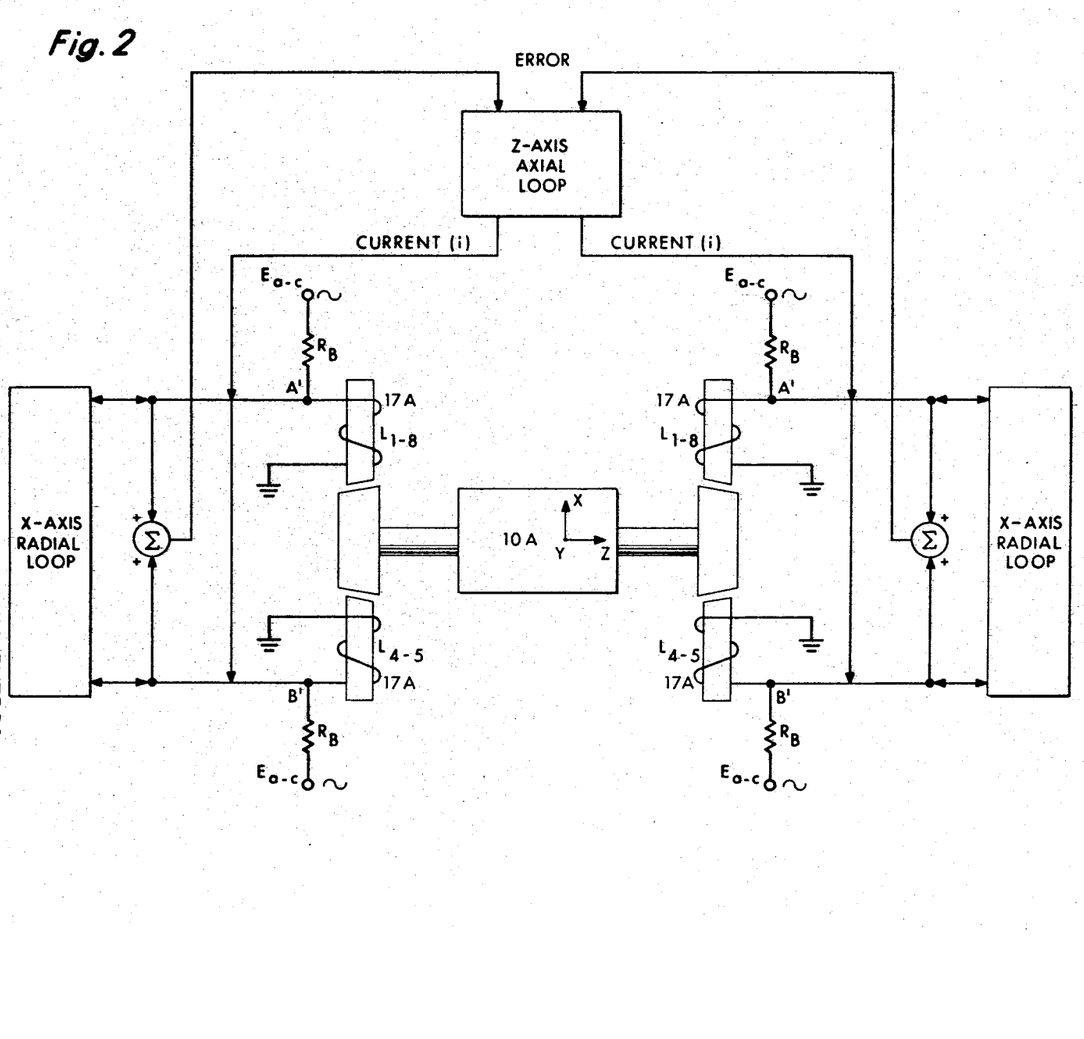
FIG. 2 is a functional diagram of the invention suspending an unbalanced mass along two of the three axes of a pendulous accelerometer.
Figure 3:
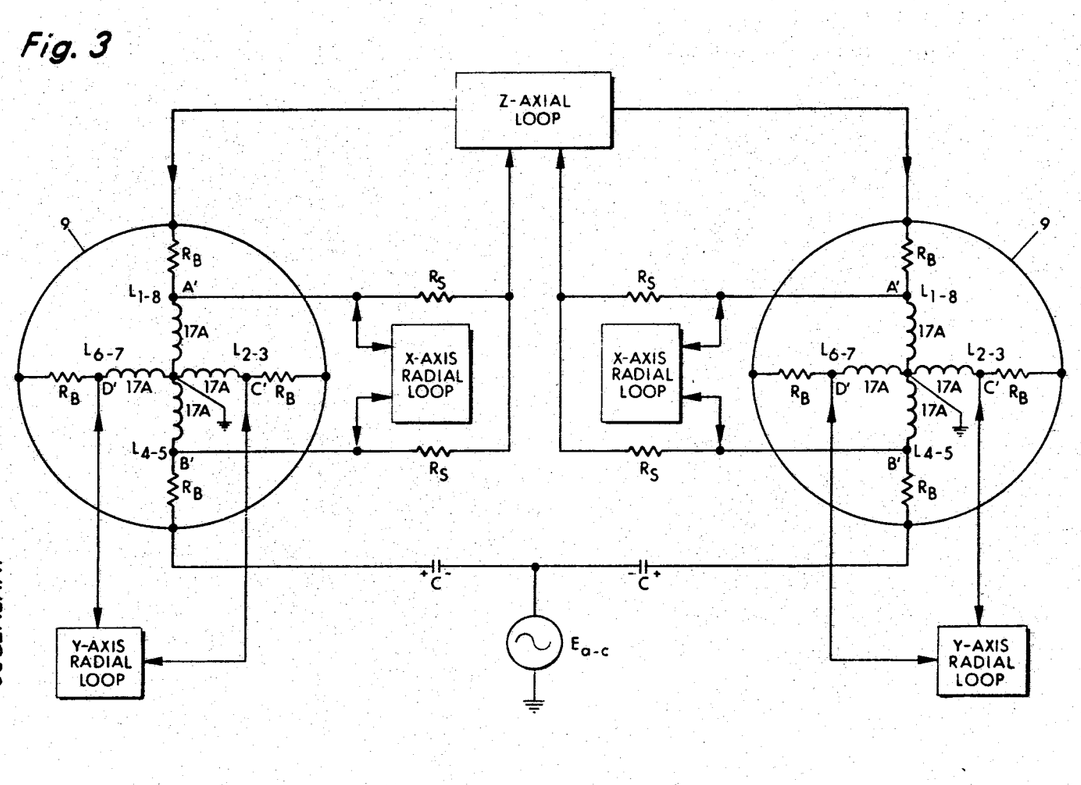
FIG. 3 is a functional diagram illustrating a three-axis suspension system for the accelerometer of FIG. 2.

The secondary loop of the modified PIPA is illustrated in FIGS. 2 and 3. The systems of FIGS. 2 and 3 operate to center mass 10A along two radial axes, $x$ and $y$, and along a single axis $z$ (the sensitive rotary axis) that is orthogonal to the radial $x$–$y$ plane. For simplicity, the $y$-axis radial control is not shown in FIG. 2. The poles of the microsyns have tapers so that a force component may be generated along the $z$ axis for axial control.

As shown in FIG. 3, the end microsyns are connected in an A-C Wheatstone bridge. The arms of the bridge comprise resistances $R_B$ and effective inductances 17A. As will be explained, each effective inductance is composed of a pair of poles that is disposed about the $x$ or $y$ radial axis. Two complementary effective inductances coincide with each axis so that any component of radial deviation of mass 10A along that axis increases one effective inductance while simultaneously decreasing the other. Thus, as mentioned in conjunction with FIG. 1, any radial deviation of the mass generates an error voltage between the terminals of the complementary inductances aligned with the corresponding radial axis.

In particular, effective inductances $L_{1-8}$ and $L_{4-5}$ are aligned with the x-axis and inductances $L_{2-3}$ and $L_{6-7}$ coincide with the y-axis. Any deviation along the $x$ axis generates a voltage difference or error signal between terminals A' and B' that is coupled to the $x$-axis radial loop circuitry. Similarly, any component of radial deviation along the $y$-axis produces an error signal between terminals C' and D' that is coupled to $y$-axis radial loop circuitry. In the event of such radial drift, the driving current required to re-position the mass is coupled directly back to increase the energy level of the appropriate effective inductance. For example, the driving current required to neutralize $x$-axis drift is coupled back from the loop circuitry to terminal A' or B', and to negate $y$-axis positional drift, driving current is coupled back to terminal C' or D'.

Any positional drift along the z-axis causes the total inductance of one microsyn to increase and the total inductance of the other to decrease. Consequently, a $z$-axis positional error signal may be generated by summing the outputs of the respective effective inductances through summing resistances $R_s$, as shown in FIG. 3, coupling the summed voltages for each microsyn to one input terminal of the axial circuitry. The axial error signal thus generated comprises the difference between the summed output voltages of the two microsyns. In response to $z$-axis drift, the axial loop circuitry couples driving current to bus line 9 in the appropriate microsyn to increase the bias energy level of all poles and generate the required axial force to restore the mass.

Figure 3A:
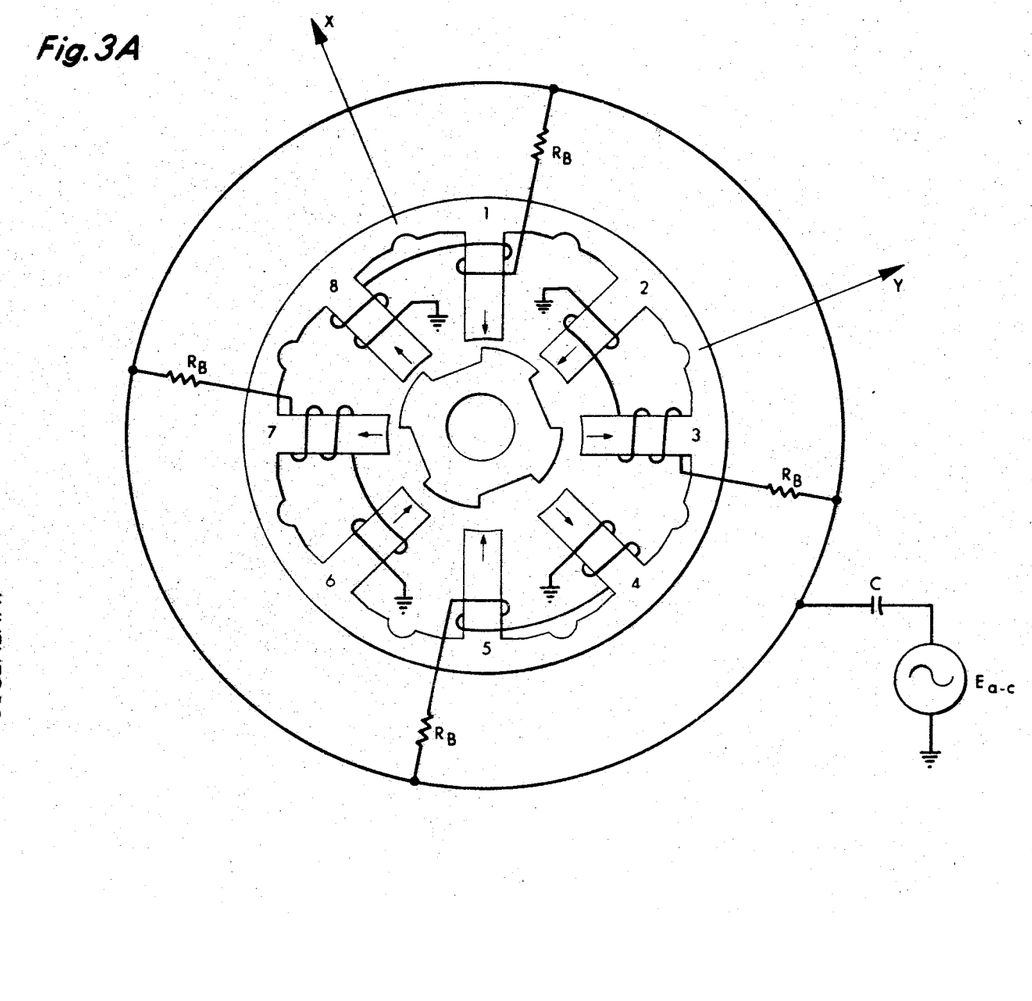
FIG. 3A illustrates the interconnections between the coils of the end microsyns in the suspensions of FIGS. 2 and 3.

The connections between the respective poles of the microsyns of FIG. 3 are more specifically illustrated in FIG. 3A. The poles are numbered 1–8 clockwise, and the direction of the windings is such that flux in paired poles 1–8, 2–3, 4–5, and 6–7 is aiding. The paired poles each generate one of the effective inductances of FIG. 3 between the excitation voltage $E_{A-C}$ and ground potential. Complementary pairs of poles corresponding with the complementary inductances of FIG. 3 are symmetrically disposed about the $x$ and $y$ radial axes.

The radial and axial loop circuits of the modified PIPA of FIGS. 2 and 3 are structurally and operationally the same as that shown in FIG. 1. The loops differ only with respect to the parameter value of components attributable to the different dynamic characteristics along the radial and axial direction and the axial circuit contains an input resistance summing network as previously explained.

Thus, to simplify the specification, the $x$-axis positional control loop is described in some detail to identify the considerations entering the design of any of the axial and radial loop circuits.

Radial suspension

Figure 4:
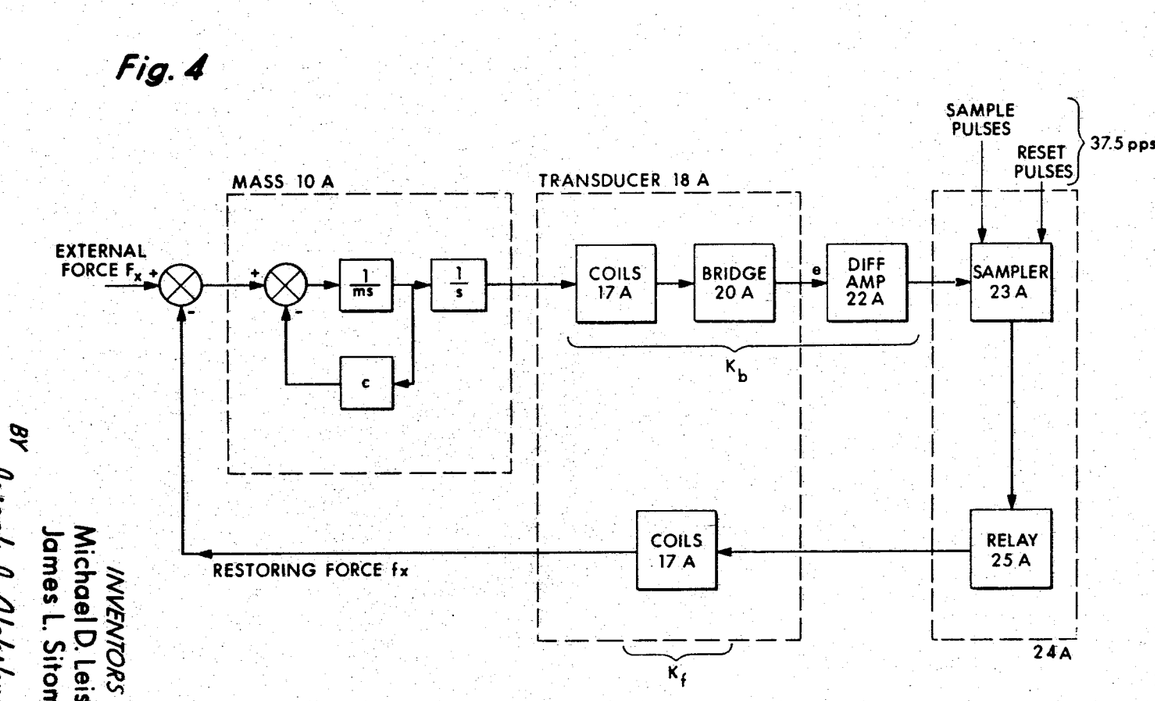
FIG. 4 illustrates one positional control loop of the systems of FIGS. 2 and 3.

A block diagram of the $x$-axis positional control loop is shown in FIG. 4. It comprises microsyn coils 17A that time share first as positional sensors and then force generators, Wheatstone bridge 20A excited at 9600 Hz., differential amplifier 22A and electronic apparatus 24A receiving sample and reset pulses at a rate of 37.5 pulses per second and comprising sampler 23A and electronic relay 25A. Along the $x$-axis, mass 10A has second order dynamics with appreciable damping, and a transfer function of:

$$\frac{1}{cs\left(\frac{m}{c}s+1\right)}$$

where $m$ is the equivalent mass and $c$ the damping factor at the point where the respective forces are applied. Operation of the positional control is such as to make the difference between the off-centering force component in the $x$ direction $F_x$, and the restoring force $f_x$ generated by the suspension in the same direction remain zero. The loop operates to hold this relationship whenever the mass shows a sufficient deviation from null along the $x$ axis. As previously mentioned in connection with FIG. 1, where an inductive transducer is employed, deviations $x$ in the mass produce inductance changes $\Delta L$ in the microsyn. Respondingly, bridge 20A generates an error signal $e$ which is amplified and received by electronic apparatus 24A. When necessary, electronic relay 25A couples D-C drive current to the microsyns and a restoring force $f_x$ is generated to counterbalance the external input force $F_x$.

System parameters

In the design of the modified PIPA, the fixed physical properties along the $x$ axis such as the damping factor $c$ and force drive $f_x$ of the respective generators, and mass time constant $m/c$, were first ascertained so a proper combination of the system variables such as bit size, closed loop gain and dead zone width could be derived to meet performance objectives. Computations were as follows.

The damping factor $c$ of the mass was measured by applying a constant force F to the mass for a period of time, say one second, and measuring the resulting deviation $x$ indicated by the open loop output signal emitted by bridge 20A. In the typical PIPA, the construction of the signal and torque microsyns differs. Thus, the damping factor $c$ corresponding to each was measured separately. Where the time constant is very small compared to one second, the mass reaches a steady state velocity $V = F/c$ immediately, and in one second, it travels $$\frac{F}{c}\ cm$$

In the selected instrument, the damping factor for signal microsyn is $1.02 \times 10^8$ and that for the torque microsyn is $4.12 \times 10^8$, both quantities in units of dynes-seconds/cm.

In order to determine the time constant $m/c$ for the mass, the equivalent mass $m$ seen at each point at which the suspension force is applied was additionally derived. The equivalent mass was ascertained by assuming the suspension had one end of mass 10A fixed within the small deadband range while the other end was being recentered. The mass then appeared as a cylinder rotating about an axis through one of its ends. The same test was applied to both the signal and torque generators. The equivalent mass $m$ for this test arrangement is defined by Equation 9, $$m = \frac{I_{cyl}}{L^2} + \frac{a^2 M}{L^2}$$

Equation (9)

where $I_{cyl}$ is the moment of inertia of the cylindrical mass about a transverse axis through the center of mass,
$L$ is the length of the mass,
$a$ is the distance between the center of mass from the pivot point, and
$M$ is the actual mass.

For the test PIPA, $I_{cyl}$ equals 35.6 grams cm.$^2$, M equals 28.5 grams, L equals 2.61 and $a$ equals 1.04 cm. for the signal microsyn and 1.58 cm. for the torque microsyn. Substituting these values into Equation 9, the equivalent mass seen by the signal generator is 9.8 grams and by the torquer 15.8 grams. The respective time constants $m/c$ therefore were $94 \times 10^{-9}$ sec. for the signal microsyn and $38.4 \times 10^{-9}$ sec. for the torque microsyn. It is noted that the time constant of the mass is indeed small compared to one second as previously assumed.

As mentioned earlier, the bit size is used as one guide in ascertaining the appropriate dead zone in the relay. It is defined as the total distance $x(\infty)$ mass 10A will travel when a restoring force is applied for one time interval $T_R$. It was determined by initially solving two pairs of differential equations for deviation $x(t)$ and its rate $\dot{x}(t)$, the first pair for the period $0 \leq t < T_R$ when $f_x$ is constant and the second pair for the interval $T_R \leq t < \infty$ when $f_x$ equals zero. By using the initial conditions $x(0) = \dot{x}(0) = 0$, the first pair of equations was evaluated at $t = T_R$, yielding the values $x(T_R)$ and $\dot{x}(T_R)$. These values represented the initial conditions for the second pair of equations and with the aid of terminal condition $\dot{x}(\infty) = 0$, the bit size $x(\infty)$ was found. In the case of damped mass 10A, the resulting bit size $x(\infty)$ equals $(f_x/c)T_R$.

The sampling period $T_S$ was chosen as .0266 second (an even multiple of the excitation period) and the time delay $T_R$ for the reset pulse selected as .0236 second. Whereas each generator develops a constant driving force $f_x$ of 16,500 dynes, the bit size for the signal and torquing microsyns is $3.82 \times 10^{-6}$ cm. and $.947 \times 10^{-6}$ cm., respectively.

To preclude undesirable limit cycling, the peak to peak deadband zone must be greater than the larger of the above bit sizes. However, this is not a sufficient condition and describing function analysis is necessary to determine whether the dead zone should be even larger. To apply this second test, the system of FIG. 3 was linearized by replacing relay 25A by its describing function and analyzing the resulting linear feedback loop to determine at which frequencies it would oscillate or limit cycle. Frequencies examined were submultiples of the sampling frequency or the frequency at which the force was applied.

Where $D(s)$ is the describing function of the nonlinear relay and $G(s)$ is the transfer function of the remaining loop, in order for a limit cycle to occur the following relationship must be satisfied $$1 + D(s)G(s) = 0 \text{ or } G(s) = \frac{-1}{D(s)}$$

Equation (10)

In the loop of FIG. 4, it was observed that transfer function $G(s)$ and the normalized function $G_n(s)$ are given by the following equations, $$G(s) = \frac{K_b K_f}{cs\left(\frac{m}{c}s + 1\right)} \text{ and } G_n(s) = \left(\frac{c}{K_f K_b}\right) G(s)$$

Equation (11)

where, $$K_b = \left(\frac{\Delta e}{\Delta x}\right)(A)$$

A being the gain of the differential amplifier, and $$K_f = \frac{.91 N^2 \mu_0 a_g E^2}{4(g_0^2)(R + r_{D-C})^2}$$

Since in the PIPA the damping constant of the signal generator is less than that of the torque generator, the former has greater influence on the inherent limit cycle modes. Since the characteristics of the signal generator are controlling, the normalized transfer function of Equation 10 versus phase angle characteristics for the signal generator are plotted in FIG. 5 relative to frequency. The describing function D for the loop of FIG. 4 was also derived. The describing function is basically a ratio of the fundamental output of the nonlinear element in the system, here electronic relay 25A, and the input to the nonlinearity. Techniques for deriving the describing function of a nonlinear element are well known in the art of nonlinear automatic control and numerous text references are available that describe the analysis. Applicants cite as one reference Dixon, M. V., "Nonlinear Sample-Data System Analysis Using Describing Functions," M.I.T. Instrumentation Laboratory Report T-404, 1965 as one reference. The resulting describing function is as appears in Equation 11.

$$D = \left|\frac{4E_T}{\pi A} \sin\left(\frac{\pi}{2}\frac{T_R}{T_S}\left(1 - 2\frac{K}{n}\right)\right)\right| \angle -\phi + \phi_R$$

Figure 5:
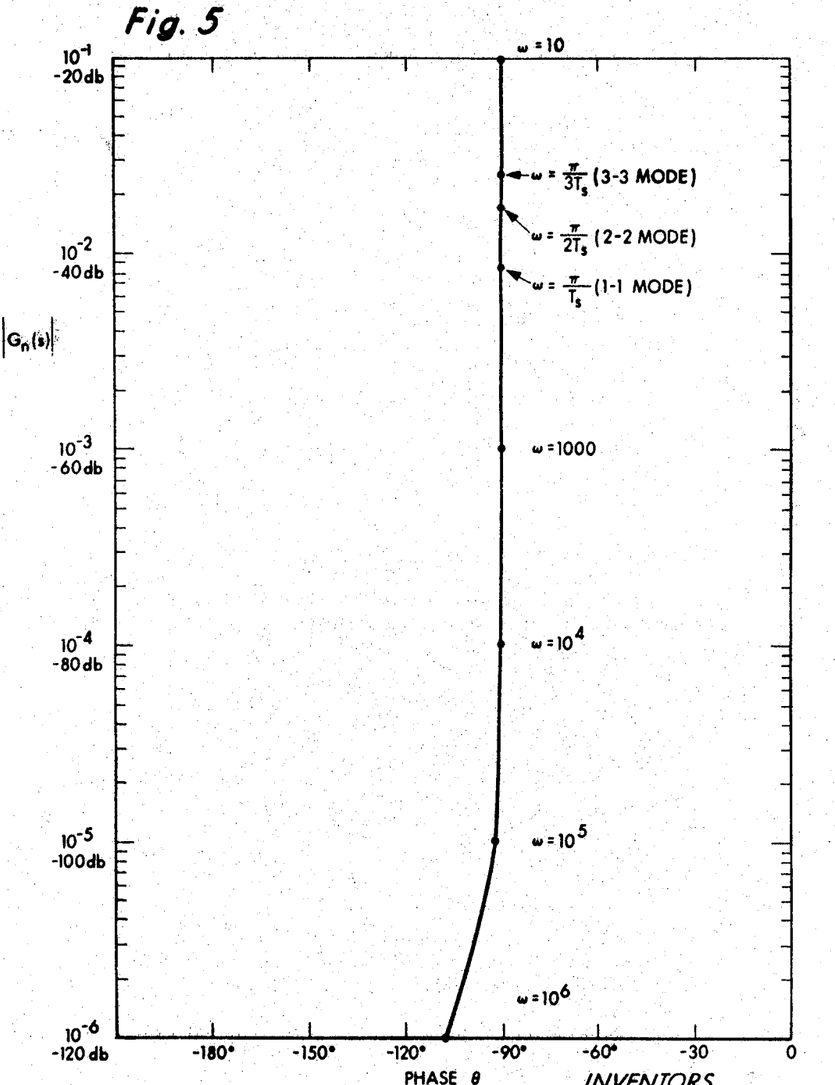
FIG. 5 is a plot of the normalized transfer function of the linear portion of the control loop of FIG. 4.
Figure 6:
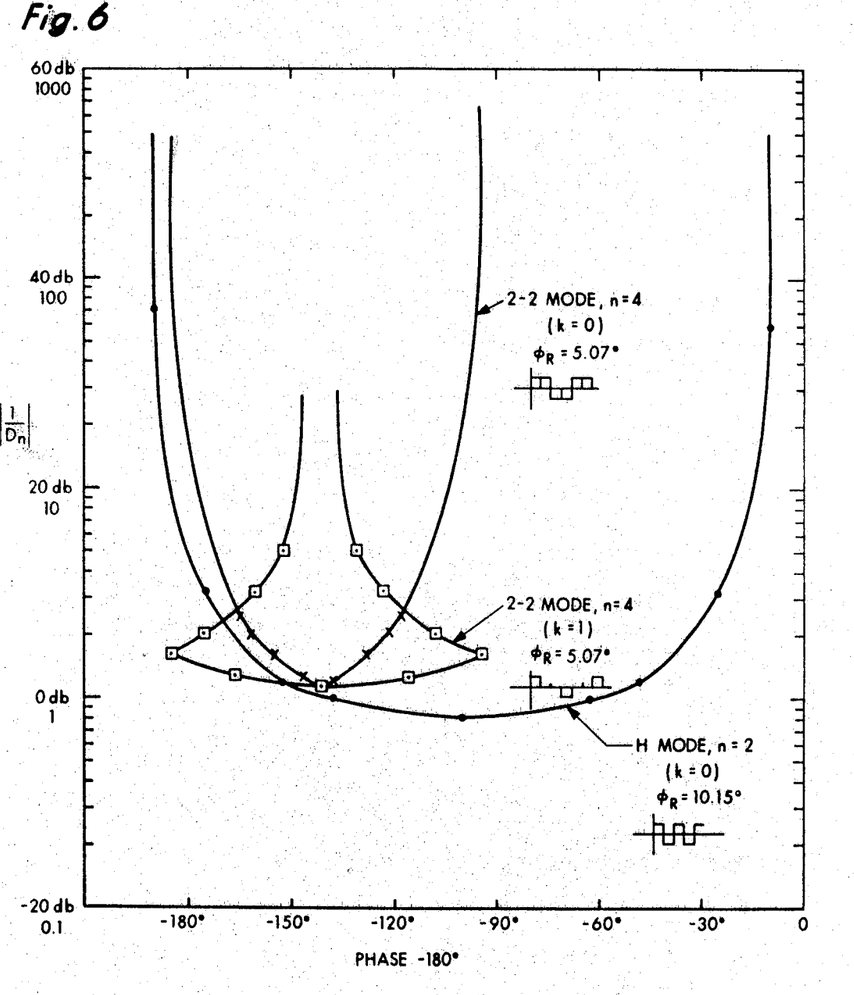
FIG. 6 is a plot of the normalized describing function for the nonlinear relay of FIG. 4.

Equation (12)

where, $\phi$ is the angle between the sample pulse and input signal for the various limit cycle modes, $$\phi_R = \left(\frac{2}{nT_S}\right)\left(\frac{T_S - T_R}{2}\right)$$

the phase lead of the fundamental relative to the sample pulse,
$n = 2, 4, 6 \ldots$ or twice the mode, and
$K = 0, 1, 2, 3, \ldots,$ $$\frac{n}{2} - 1$$

the possible submodes in any mode. The normalized describing function $D_n$ versus phase angle characteristic is plotted in FIG. 6 for limit cycle modes. With the aid of the characteristics of FIGS. 5 and 6, Equation 10 which describes the condition necessary to establish a limit cycle, may be solved graphically by superimposing the two figures. Specifically, a "one-one" limit cycle will occur when the "one-one" frequency point of the normalized transfer function $G_n(s)$ curve just enters the "one-one" mode region of the $1/D_n$ characteristic. The higher modes can occur if the same conditions are satisfied for corresponding higher mode regions. For the present PIPA, the only possible limit cycle that can occur in the radial direction is the "one-one" mode since that is the only possible condition under which the characteristics of FIGS. 5 and 6 can coincide.

The threshold level necessary to eliminate the "one-one" limit cycle mode was graphically determined by noting that the inverse describing function plot may be attenuated by 39 db before it intersects with the "one-one" limit cycle mode. Consequently, $$20 \log\left(\frac{c}{K_b K_f}\right) + 20 \log \frac{E_T}{E} = -39 \text{ db}$$

using $c$ for the signal generator = $1.02 \times 10^8$ dynes sec./cm., and selecting $K_b = 3.69 \times 10^5$ volts/cm.
$K_f = 1.86 \times 10^3$ dynes/volts
$E = 10$ volts the sampling threshold $E_T = .74$ volt.

Dividing $E_T$ by gain $K_b$, the threshold deviation $X_T$ equals $2.01 \times 10^{-6}$ cm. This corresponds to a readband of $4.02 \times 10^{-6}$ cm. peak to peak.

The limiting threshold is therefore that predicted by the describing function technique, since the deadband condition of $4.02 \times 10^{-6}$ cm. necessary to elminate the "one-one" mode limit cycle is slightly larger than the bit size condition of $3.82 \times 10^{-6}$ cm. For the signal microsyn, $$4.02 \times 10^{-6} \text{ cm.}$$

is then the smallest deadband possible before this generator will yield a limit cycle.

Electronics

Figure 7:
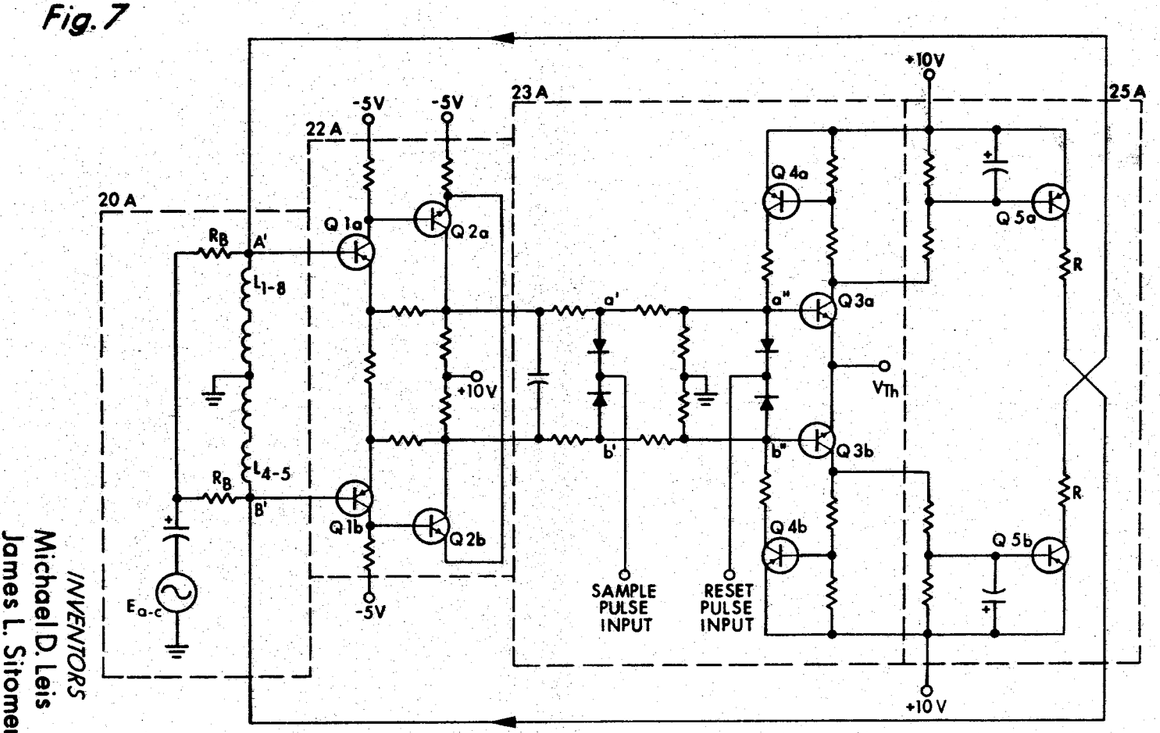
FIG. 7 is a circuit diagram of electronic circuitry for the control loop of FIG. 4.

Electronic circuitry for the x-radial control loop of FIG. 4 is shown in FIG. 7. As mentioned earlier, the circuitry comprises Wheatstone bridge 20A, differential amplifier 22A, sample and hold circuit 23A, and electronic relay 25A. Circuit 23A has terminals for receiving sample pulses of positive polarity and reset pulses of negative polarity. Sample pulses are timed to coincide with the 90 degree peak point of the amplified error voltage. Reset pulses are timed to follow sample pulses after a delay $T_R$ as previously discussed. Ordinarily, the sample pulse terminal is at zero potential and the reset pulse terminal is positively biased.

The output signals appearing at terminals A' and B' of bridge 20A are sinusoids and the terminal corresponding to inductor closer to the suspended mass being the greater amplitude. Amplifier 22A amplifies the voltage difference between the two signals. The amplified difference signal is coupled to points $a'$ and $b'$ in sampler 23A. Due to the balancing operation of amplifier 22A, the error voltage at point $a'$ is positive relative to the voltage at point $b'$ when the mass is displaced toward inductor 1–8 (positive positional error). Conversely, the voltage at point $b'$ is positive realtive to the voltage at point $a'$ when the mass is displaced toward inductor 4–5 (negative positional error).

As points $a'$ and $b'$ are diode coupled to the sample pulse input terminal, any positive error at those points is clamped to a low positive voltage except on the appearance of a sample pulse. A sample pulse back-biases the diodes and permits a positive error signal to be coupled to the corresponding input terminals $a''$ or $b''$ of a balanced hold circuit containing coacting transistors $Q_{3a}$, $Q_{4a}$ and $Q_{3b}$, $Q_{4b}$. If terminal $a''$ is sufficiently positive to exceed the predetermined threshold voltage $V_{Th}$, transistors $Q_{3a}$ and $Q_{4a}$ conduct and a (+E) state is stored in the hold circuit. Similarly, if the error voltage of terminal $b''$ is sufficiently positive, transistors $Q_{3b}$ and $Q_{4b}$ conduct and a (−E) state is stored. If the amplitude of the error signal at terminals $a''$ or $b''$ is not positive enough to overcome threshold voltage $V_{Th}$, the hold circuit stores a state zero. In any event, the coupling of a reset pulse to terminals $a''$ or $b''$ through the diodes resets the hold circuit to a zero state condition for the next sampling interval.

Whenever transistor combinations $Q_{3a}$, $Q_{4b}$ or $Q_{3b}$, $Q_{4b}$ are conducting, the corresponding drive transistor $Q_{5a}$ or $Q_{5b}$ in relay 25A is activated and supplies drive current to the appropriate terminal of bridge 20A. Thus, when the hold circuit stores state (+E), drive current is coupled to terminal B' of bridge 20A; and when a state (−E) is stored, drive current is directed to terminal A'. The storage of a zero state produces no drive current. The drive current energizes the inductor having the wider separation from the mass for a period $T_R$. The energized inductor imparts a pulse of restoring force on the mass. Current drive pulses are continuously applied to the appropriate terminal until the mass is back inside the deadband zone.

Modifications

While a particular embodiment of the system has been described, the invention is not intended to be limited to those details. Various modifications may be made in the system and yet remain within the scope of the invention. Two of the more notable ones are now discussed.

The transducer in the preferred embodiment is described as inductive, but a capacitive device may also suit the purpose. In such a case the mass would be fitted with capacitive surfaces that react with opposing ones in the transducer. An A-C capacitive bridge would be formed analogous to the bridge in the preferred embodiment of FIG. 3. The bridge would produce an output error signal whose phase and amplitude is indicative of the deviation of the mass from the null position. The error voltage would conform to the well known capacitance equation relating voltage to the displacement of opposing capacitive surfaces. Electronic apparatus similar to that shown in FIG. 7 would generate voltage pulses required to suspend the mass.

As discussed earlier, the present invention may also provide a measure of force or force related quantities. The pulses of drive current coupled to the transducers of FIG. 1 are of fixed amplitude and fixed duration $T_R$. With these quantities known, it is possible to compute a scale factor for measuring the net corrective force operating on the mass. The algebraic sum of the current pulses supplied to the terminals of the transducer (pulses to one terminal counted as positive and to the other negative) multiplied by the scale factor yields the net force acting on the mass. Where the transducer is capacitive and the corrective force generated by voltage pulses the algebraic sum of those pulses is indicative of net force. These measurements may be implemented by a combination of a digital counter and indicating apparatus as is well known in the art.

To cover these and other modifications, the scope of the invention is defined in the appended claims.

What is claimed is:

1. An electronic suspension system employing force rebalancing feedback for use in force measuring instruments, comprising:
    (a) a reference axis having a null position and first and second threshold positions, one on each side of said null position;
    (b) a mass having first and second sides said mass positioned along said axis normally near said null position and between said first and second threshold positions;
    (c) a voltage source;
    (d) a circuit comprising first and second reactive elements symmetrically disposed about said mass and connected to receive electric energy from said voltage source at the respective terminal of each element such that, upon excitation thereof, said elements coact with the sides of said mass so as to produce between said terminals an error signal of a first polarity when said mass deviates from said null in the direction of said first reactive element having a first error amplitude level when said first side of said mass coincides with said first threshold position, and an error signal of a second polarity when said mass deviates from said null in the direction of said second reactive element having a second error amplitude level when said second side of said mass coincides with said second threshold position;
    (e) a timing circuit which generates a continuous train of clock pulses comprising sample pulses which occur with a repetition period $T_S$, said clock pulses further comprising a series of reset pulses each of which succeeds a sample pulse after a time delay $T_R$;
    (f) a sampler coupled to said terminals and to said timing circuit which, responsive to said sample pulse, samples said error signal during the duration of said sample pulse, and stores said sampled error signal, and which, responsive to said reset pulse, clears said storage to zero; and
    (g) a relay coupled to said sampler and to said terminals, said relay applying pulses of driving power of fixed amplitude and duration $T_R$ to the terminal of said first element when said stored error signal is of said second polarity and attains said second error amplitude level, and applying pulses of driving power to the terminal of said second element when said stored error signal is of said first polarity and attains said first error amplitude level, wherein said relay terminates the application of said driving power upon clearing of said storage to zero, and whereby the application of said driving power to said terminals generates a restoring force on said mass.

2. The electronic suspension system of claim 1 wherein said circuit comprises an A-C inductance bridge and wherein said reactive elements comprise complementary inductances and wherein said pulses of driving power comprise constant current pulses of duration $T_R$.

3. The electronic suspension system of claim 1 comprising a counter coupled to said terminals for algebraically summing the number of pulses of driving power applied respectively to the terminal of said first element and the terminal of said second element, wherein said pulses are designated positive if producing a restoring force in a first direction and designated negative if producing a restoring force in an opposite direction, and further comprising indicating means coupled to said counter for readout of said counter.

4. An electronic suspension system employing force rebalancing feedback for restoring a mass in the system to a null position, said system comprising, in combination:

(a) a transducer comprising a stator having at least one pair of complementary poles symmetrically disposed about said mass along a common axis;

(b) a bridge circuit connected to said stator and having a first terminal at one of said poles and a second terminal at the other of said poles, said bridge circuit exciting both of said poles in said pair, such that displacement of said mass from said null position causes a current unbalance in said bridge circuit, generating a difference signal across said terminals, the amplitude and phase of said difference signal being indicative of the amount and direction, respectively, of said mass displacement, wherein a phase of first polarity indicates mass displacement in the direction of said first terminal and a phase of second, opposite polarity indicates mass displacement in the direction of said second terminal;

(c) a differential amplifier coupled to said terminals for measuring and amplifying said difference signal;

(d) a timing circuit generating a continuous train of clock pulses comprising sample pulses which occur with a constant repetition rate $T_S$, and further comprising a series of reset pulses, each of which succeeds a sample pulse after a time delay $T_R$;

(e) zero order sample-and-hold circuitry coupled to said differential amplifier and to said timing circuit, comprising gating means which, responsive to a sample pulse, samples said difference signal during the duration of said sample pulse, and comprising holding means which stores a first signal state if the amplitude of said difference signal exceeds a threshold value and the phase is of said first polarity, stores a second signal state if the amplitude of said difference signal exceeds said threshold value and the phase is of said second opposite polarity, and stores a zero state if the amplitude of said difference signal does not exceed said threshold level, and wherein said holding means is cleared to zero state on receipt of said reset pulse; and (f) a three-level electronic relay coupled to said sample-and-hold circuitry and to said terminals which applies pulses of driving power of fixed amplitude and duration $T_R$ to said first terminal when said stored signal is of said second state and applies pulses of driving power of fixed amplitude and duration $T_R$ to said second terminal when said stored signal is of said first state, and wherein said relay terminates any of said pulses of driving power being applied to said terminals whenever said holding means assumes said zero state.

5. The electronic suspension system of claim 4 wherein said transducer comprises an A-C inductive device, said bridge is an A-C inductance bridge and wherein said pulses of driving power from said relay are of constant current.

6. The electronic suspension system of claim 4 wherein said amplifier is de-activated upon termination of a sample pulse applied to said sample-and-hold circuit and re-activated upon application of said reset pulse.

7. The electronic suspension system of claim 4 further comprising a binary counter for determining an algebraic sum of said pulses of driving power, wherein said pulses applied to one of said terminals producing a restoring force in one direction are designated positive and said pulses applied to the other of said terminals producing a restoring force in an opposite second direction are designated negative.

References Cited

UNITED STATES PATENTS

| | | | |
|---|---|---|---|
| 2,905,876 | 9/1959 | Hillman | 318—331 XR |
| 3,159,037 | 12/1964 | Blitzer | 73—517 |
| 3,204,466 | 9/1965 | Henderson | 73—517 XR |
| 3,226,979 | 1/1966 | De Boice | 73—517 |
| 3,323,040 | 5/1967 | Wright | 73—517 XR |
| 3,378,745 | 4/1968 | James | 318—331 |

JAMES J. GILL, Primary Examiner

U.S. Cl. X.R.
308—10; 318—32